US012625964B2

(12) United States Patent
Suresh et al.

(10) Patent No.: US 12,625,964 B2
(45) Date of Patent: May 12, 2026

(54) DOCUMENT OBJECT MODEL (DOM) INTEGRITY CHECK USING HASH VERIFICATION

(71) Applicant: BANK OF AMERICA CORPORATION, Charlotte, NC (US)

(72) Inventors: Shravan Kumar Vellore Suresh, Bothell, WA (US); Stephen L. Yeager, Seattle, WA (US); Nidhiben Patel, McKinney, TX (US); Lavanya Paruchuri, Renton, WA (US); Mohana Murali Shivashankar, Everett, WA (US); Giri Raj Pandit, Lynnwood, WA (US); Varsha Kotagiri, Bentonville, AR (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 50 days.

(21) Appl. No.: 18/659,467

(22) Filed: May 9, 2024

(65) Prior Publication Data

US 2025/0348587 A1     Nov. 13, 2025

(51) Int. Cl.
    *G06F 21/57*        (2013.01)
    *G06F 21/55*        (2013.01)
    *G06F 21/60*        (2013.01)
(52) U.S. Cl.
    CPC ............ *G06F 21/57* (2013.01); *G06F 21/554* (2013.01); *G06F 21/602* (2013.01)
(58) Field of Classification Search
    None
    See application file for complete search history.

(56) References Cited

U.S. PATENT DOCUMENTS

| | | | |
|---|---|---|---|
| 8,677,481 B1 | 3/2014 | Lee | |
| 9,218,479 B2 | 12/2015 | Collinge | |
| 10,148,689 B2 * | 12/2018 | Lu | H04L 63/1425 |
| 10,367,903 B2 | 7/2019 | Li | |
| 10,484,424 B2 | 11/2019 | Tao | |
| 10,700,860 B2 | 6/2020 | Walrant | |
| 11,297,101 B1 | 4/2022 | Orhan | |
| 11,418,486 B2 | 8/2022 | Mundilla Garcia | |
| 11,757,875 B2 | 9/2023 | Sosiade | |
| 12,192,233 B2 | 1/2025 | Singh | |
| 2003/0145197 A1 * | 7/2003 | Lee | G06F 21/64 |
| | | | 713/168 |
| 2006/0137014 A1 | 6/2006 | Hurst | |
| 2010/0293616 A1 | 11/2010 | Young | |
| 2012/0304249 A1 * | 11/2012 | Luo | G06F 21/00 |
| | | | 726/1 |

(Continued)

OTHER PUBLICATIONS

"XML Digital Signatures", downloaded from <https://learn.microsoft.com/en-us/previous-versions/windows/desktop/msmq/ms703214(v=vs.85)>. Oct. 18, 2016. (Year: 2016).*

*Primary Examiner* — Scott B Christensen

(74) *Attorney, Agent, or Firm* — Moore & Van Allen PLLC; Nicholas C. Russell

(57)                ABSTRACT

Webpage integrity is monitored using hash verification. A hash verification process is implemented to detect unauthorized changes to value field(s) in a webpage's source code and, while the user is conducting an active web session on the webpage, an alert, which may be communicated via the webpage, is generated and communicated to a user in response to determining that there was an unauthorized change.

17 Claims, 6 Drawing Sheets

(56) References Cited

U.S. PATENT DOCUMENTS

| | | |
|---|---|---|
| 2013/0276126 A1 | 10/2013 | Zhou |
| 2014/0317754 A1 | 10/2014 | Niemela |
| 2016/0065613 A1 | 3/2016 | Cho |
| 2017/0034203 A1 | 2/2017 | Long |
| 2018/0205705 A1* | 7/2018 | Kupferschmied .... G06F 21/554 |
| 2019/0364058 A1 | 11/2019 | Legault |
| 2020/0195694 A1* | 6/2020 | Kalinin ................ G06Q 10/107 |
| 2021/0182374 A1 | 6/2021 | Wurmfeld |
| 2021/0240856 A1 | 8/2021 | Pham |
| 2022/0092214 A1* | 3/2022 | Brannon .............. G06F 21/577 |
| 2024/0146759 A1 | 5/2024 | Talmor |
| 2024/0340315 A1 | 10/2024 | Hales |

* cited by examiner

202

IMPLEMENT A HASH VERIFICATION PROCESS TO DETECT
UNAUTHORIZED CHANGES TO ONE OR MORE VALUE FIELDS OF A WEBPAGE,
WHEREIN THE WEBPAGE IS CONTROLLED BY AN ENTITY AND COMPRISES
SOURCE CODE THAT INCLUDES THE ONE OR MORE VALUE FIELDS.

204

GENERATE AN ALERT AND COMMUNICATING THE ALERT TO A USER
IN REPSONSE TO DETERMINING THAT THERE WAS AN UNAUTHORIZED CHANGE,
WHEREIN THE USER IS CONDUCTING A WEB SESSION ON THE WEBPAGE.

FIGURE 2

DOCUMENT OBJECT MODEL (DOM) INTEGRITY CHECK USING HASH VERIFICATION

TECHNOLOGICAL FIELD

The present invention is related generally to monitoring webpage integrity and, more specifically, using hash verification to detect unauthorized changes and alert webpage users of such unauthorized changes.

BACKGROUND

Applicant has identified a number of deficiencies and problems associated with monitoring the integrity of a webpage during a user's web session on such webpage. Users are susceptible to elaborate social engineering attacks in which a bad actor convinces the user to give them control over their system and log into their user account on a website. The bad actor may then change the content of the webpage once the user is logged in to essentially trick them into complying with the bad actor's requests.

Therefore, a need exists to develop systems, computerized methods, computer program products and the like that will allow for webpages to monitor unauthorized changes on the webpage and notify the user when they may be subject to such a scam. Through applied effort, ingenuity, and innovation, many of these identified problems have been solved by developing solutions that are included in embodiments of the present disclosure, many examples of which are described in detail herein.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide for systems, methods, computer program products and the like that provide for monitoring the integrity of a webpage during a user session. Specifically, the webpage monitors its source code to detect unauthorized changes to any of the value fields in the source code using hash verification and notifies the user if there is an unauthorized change.

A webpage that is controlled by an entity and comprises source code including various value fields. The source code is embedded with a source code addendum. In some embodiments, the source code addendum may comprise JavaScript code. The source code addendum implements a hash verification process to detect unauthorized changes to the value fields during a user's web session and, in response to detecting an unauthorized change, generates and communicates an alert to the user.

In specific embodiments of the invention, the hash verification process includes generating a hash value corresponding with each of the value fields. When the webpage initially loads during a user session, hash values for all the value fields are generated and stored. In further embodiments of the invention, each time the webpage loads or reloads during the user session, new temporary hash values are generated and compared to the stored hash values. If the temporary hash values do not match the stored hash values, the source code addendum determines that there has been an unauthorized change.

In specific embodiments of the invention, an authorized change would be initiated by the entity. When the entity makes a change, the stored hash value would be changed directly by the entity, such that when the temporary hash values are generated upon the webpage reloading, the temporary hash values would still match the stored hash values. In additional embodiments, the user may request a change to be made by the entity through an Application Programming Interface (API).

Moreover, in specific embodiments of the invention, when an unauthorized change is detected, the source code addendum generates an alert to notify the user of the unauthorized change and communicates the alert by displaying it on the webpage during the user's web session. In additional embodiments of the invention, the source code addendum also generates a second alert to notify the entity of the unauthorized change.

As such, the present invention provides for monitoring changes to a webpage to notify users of unauthorized changes.

A system for monitoring webpage integrity defines first embodiments of the invention. The system includes a webpage controlled by an entity, where the entity may be any organization, establishment, company, or institution, such as a financial institution, or the like. The webpage is made up of source code and the source code includes one or more value fields. In the context of a financial institution, for example, there may be value fields for each of the name of the account holder, account balance, account number, name of transfer recipients, details of transactions, or the like.

The system further includes a source code addendum that is embedded into the webpage's source code and is configured to implement a hash verification process to detect unauthorized changes to any of the value fields during a user's session on the webpage and generate and communicate an alert to the user if any unauthorized change is detected.

In specific embodiments of the invention, the hash verification process includes generating and storing one or more hash values when the webpage first loads during the web session. The webpage may first load, among others, when the user first enters the webpage or when the user enters in the user's authentication credentials or otherwise logs into the webpage. Each stored hash value is generated for a corresponding value field, such that each value field has a corresponding and unique hash value. In some embodiments of the invention, the stored hash values are stored in the user session storage and are deleted once the user session ends. The user session may end, for example, when the user logs out or closes the webpage. When a second user session begins, such as when the user logs in or opens the webpage again, new hash values are generated for all value fields and stored anew. In further embodiments, a second user session may begin immediately after the first user session ends.

In specific embodiments of the invention, the hash verification process further includes generating one or more temporary hash values for each subsequent time that the webpage loads or reloads during the user's web session. Each temporary hash value is generated for a corresponding value field, such that each value field has a corresponding and unique hash value. The temporary hash values are not stored and are regenerated every time the page loads or reloads within the user session. Each time temporary hash values are generated, the temporary hash values are compared with the stored hash values, such that the temporary hash value generated for a specific value field is compared with the stored hash value corresponding with that value field. In some embodiments of the invention, all temporary hash values may be compared with all stored hash values. Such comparison may help detect an unauthorized change when there are more stored hash values than temporary hash values or vice-versa, indicating that a value field was added or removed altogether.

In more specific embodiments of the invention, the source code addendum is further configured to determine that an unauthorized change has occurred when the temporary hash values do not match the stored hash values. In further embodiments, the webpage reloads each time a change is made, whether authorized or unauthorized. Thus, when a change is made, the webpage reloads, triggering a comparison, allowing all changes to be monitored and checked by the source code addendum.

In further embodiments of the invention, an authorized change to a value field would result in the stored hash value corresponding to the changed value field being updated directly by the entity. An authorized change may be one made by the entity directly or at the request of the user or another trusted source. For example, in the case of a financial institution, the financial institution may make a change to the user's account of its own accord, such as if it's deducting maintenance assessment from the user's account, at the request of the user, such as if the user requested to transfer money out of the user's account, or at the request of another trusted source, such as if the financial institution was requested by another individual or entity to transfer money into the user's account. If an authorized change is made during the user session, the stored hash value would change along with the value field. The webpage would reload as soon as the change is made, but since the stored hash value was also changed, when the temporary hash value is compared to the stored hash value, it would not be detected as an unauthorized change. In further embodiments, any display of the value field on the webpage or to the user would also change for the user to see.

In specific embodiments of the invention, the system further includes an Application Programming Interface (API). The user may request an authorized change from the entity using the API. For example, in the case of a financial institution, if the user attempts to make a transfer through the financial institution's webpage, the request for the transfer would go to the financial institution and the financial institution would make the changes to reflect such transfer, making those changes authorized changes.

In specific embodiments, the source code addendum generates an alert to the user to notify the user that it detected an unauthorized change. The alert is communicated to the user. In some embodiments, the alert may be communicated to the user by displaying the alert on the webpage during the user's web session. In further embodiments, the alert may be communicated to the user through a text alert, email, or notification on the entity's phone application in addition to or in lieu of the alert being displayed on the webpage. In yet further embodiments, the user may also be sent an information sheet with more details about the unauthorized changes detected, information about the consequences of such a detection, steps for the user to take to prevent further issues, or the like.

In other specific embodiments of the invention, a second alert may be generated and communicated to the entity in response to determining that there was an unauthorized change. The entity may be alerted that there was an unauthorized change and may be provided with details about the unauthorized change. Such an alert could prompt the entity to ask the user to change the user's password or authentication credentials, for example.

A computer-implemented method for monitoring webpage integrity defines second embodiments of the invention. The computer-implemented method includes implementing a hash verification process to detect unauthorized changes to one or more value fields of a webpage that is controlled by an entity and comprises source code including the value fields, during a user's web session. In specific embodiments, the hash verification process includes generating and storing one or more hash values when the webpage first loads during the web session. Each stored hash value is generated for a corresponding value field, such that each value field would have a corresponding and unique hash value. The hash verification process may further include generating one or more temporary hash values for each subsequent time that the webpage loads or reloads during the user's web session. Each temporary hash value is generated for a corresponding value field, such that each value field would have a corresponding and unique hash value. The temporary hash values are not stored and would be regenerated every time the page loads or reloads within the user session. Each time temporary hash values are generated, the temporary hash values are compared with the stored hash values, such that the temporary hash value generated for a specific value field would be compared with the stored hash value corresponding with that value field. In some embodiments, all temporary hash values may be compared with all stored hash values. Such comparison may help detect an unauthorized change when there are more stored hash values than temporary hash values or vice-versa, indicating that a value field was added or removed altogether. In further embodiments, the method includes determining that there was an unauthorized change when the temporary hash values do not match the stored hash values.

In other specific embodiments, the method further includes the stored hash value corresponding to a value field that is changed as the result of an authorized change being updated directly by the entity. An authorized change may be requested by the user through the use of an API.

The method further includes generating an alert and communicating the alert to the user notifying the user that there was an unauthorized change to the webpage. In specific embodiments of the invention, the alert may be communicated to the user by displaying the alert on the webpage during the user's web session. In specific embodiments, the alert may be communicated to the user by displaying it on the webpage during the user's session. In further embodiments, method further includes generating a second alert to notify the entity of any unauthorized changes.

A computer program product including a non-transitory computer-readable medium defines third embodiments of the invention. The computer-readable medium including sets of codes for causing computing devices(s) to implement a hash verification process to detect unauthorized changes to one or more value fields of a webpage. The webpage is controlled by an entity and comprises source code that includes one or more value fields. The sets of codes cause the computing device(s) to generate and store one or more stored hash values when the webpage first loads during a user's web session as part of the hash verification process. Each stored hash value is generated for a corresponding value field, such that each value field would have a corresponding and unique hash value. The sets of codes further cause the computing device(s) to generate one or more temporary hash values for each subsequent time that the webpage loads or reloads during the user's web session. Each temporary hash value is generated for a corresponding value field, such that each value field would have a corresponding and unique hash value. The sets of codes cause the computing device(s) to compare the temporary hash values with the stored hash values each time temporary hash values are generated. The sets of codes further cause the computing device(s) to determine that there was an unauthorized change when the temporary hash values do not match the stored hash values.

In specific embodiments of the invention, the sets of codes cause the computing device(s) to allow the entity to directly update the stored hash value corresponding to an authorized change to a value field and to allow the user to request an authorized change from the entity using an API.

In response to detecting an unauthorized change, the sets of codes further cause the computing device(s) to generate an alert and communicate the alert to the user, notifying the user that there was an unauthorized change. In specific embodiments the sets of codes cause the computing device(s) to communicate the alert to the user by displaying the alert on the webpage during the user's web session. In further embodiments, the sets of codes cause the computing device(s) to generate a second alert and communicate the second alert to the entity, notifying the entity of any unauthorized changes.

Thus, according to embodiments of the invention, which will be discussed in greater detail below, the present invention provides for monitoring a webpage for unauthorized changes. Specifically, webpage integrity is monitored through hash verification, which includes generating and storing hash values corresponding to the value fields in the webpage's source code when the webpage first loads during a user session and generating temporary hash values whenever the webpage loads or reloads during that user session. The temporary hash values are compared with the stored hash values, and if they do not match, an alert is generated and communicated to the user, notifying the user of any unauthorized changes. In specific embodiments of the invention, authorized changes may be made by the entity when the entity updates the stored hash value corresponding to the value field changed by the entity. Further embodiments include generating a second alert and communicating that second alert to the entity, notifying the entity of any unauthorized changes.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
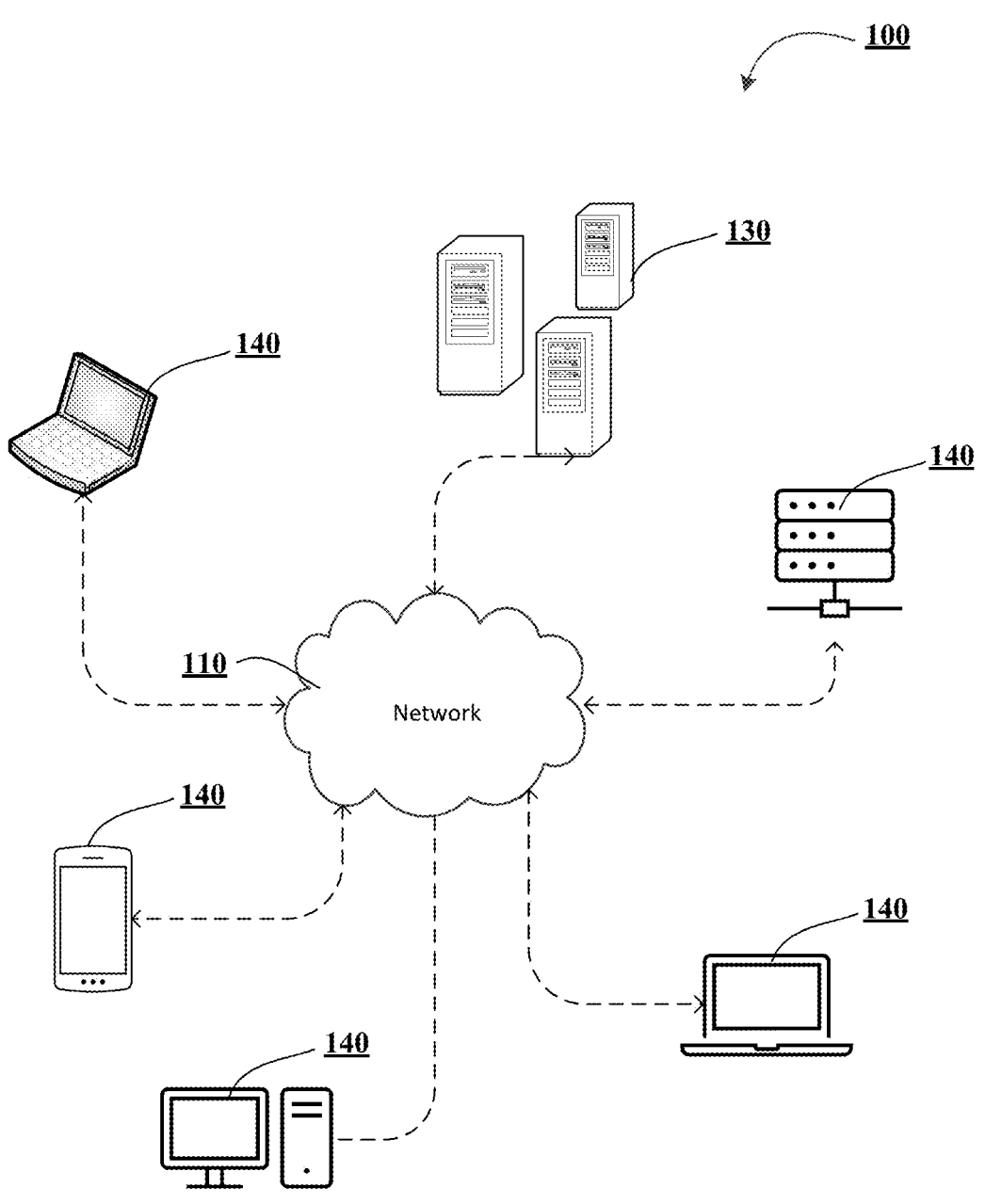
Figure 1B:
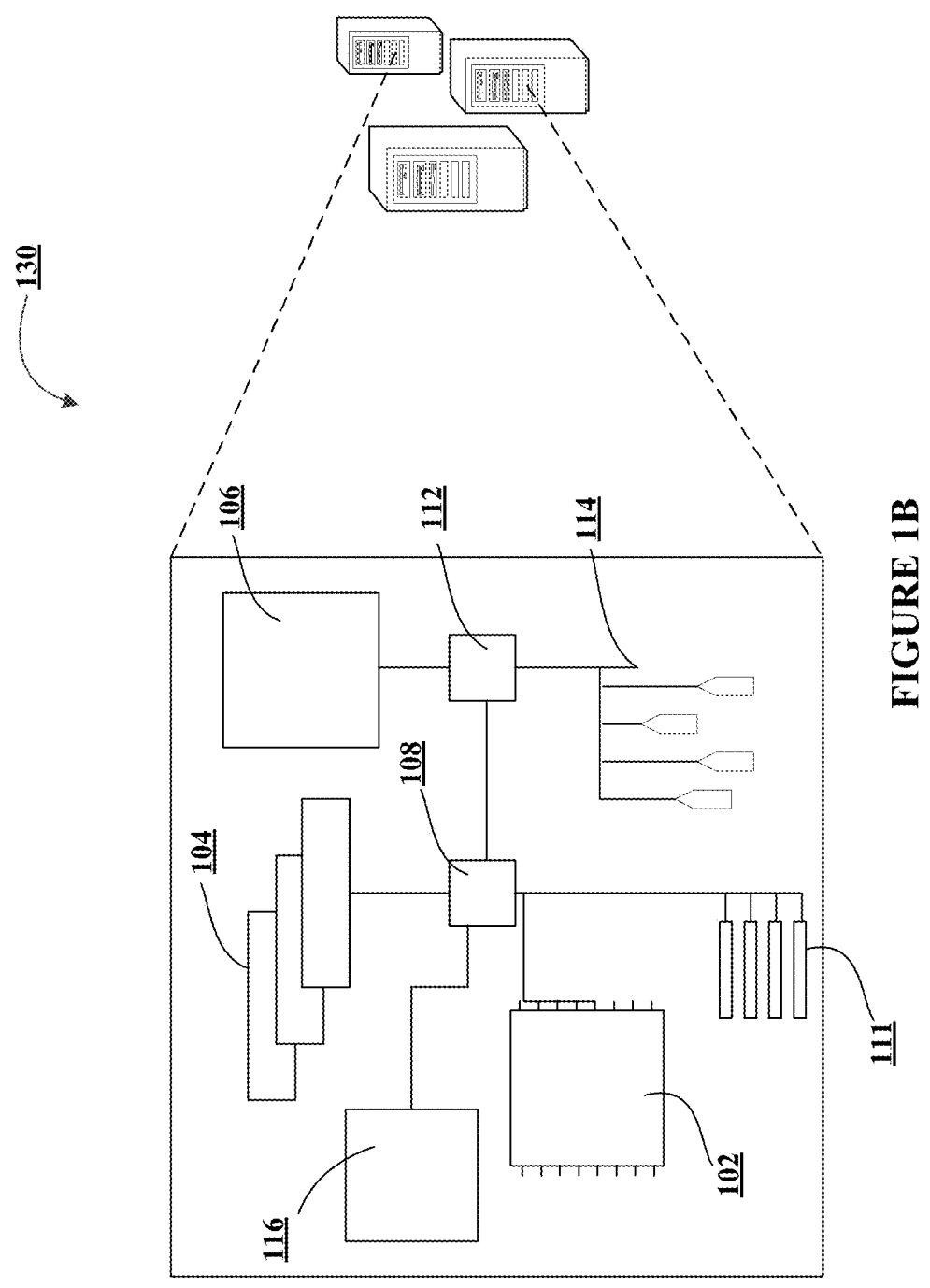
Figure 1C:
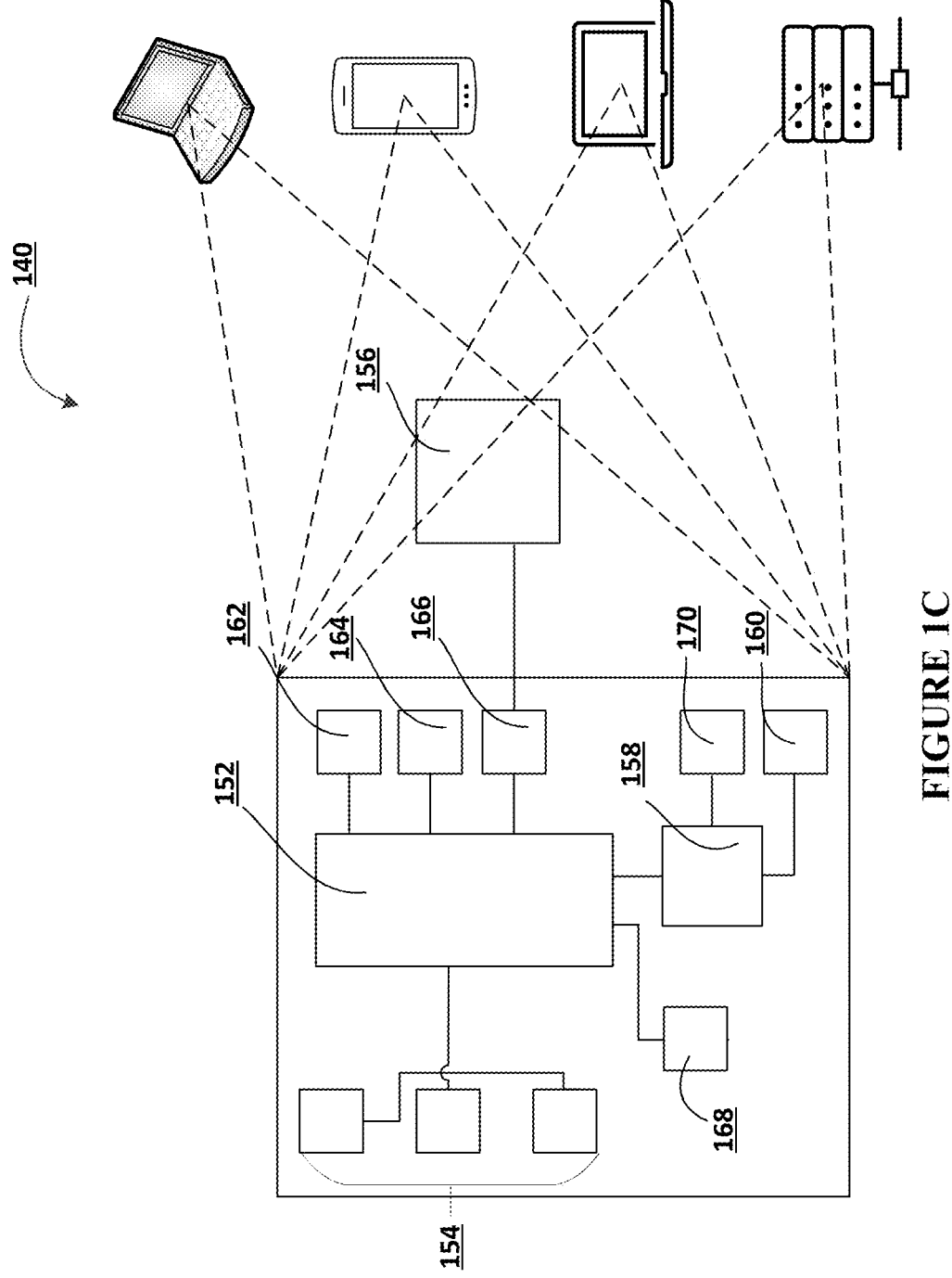

FIGS. 1A-1C illustrates technical components of an exemplary distributed computing environment for monitoring webpage integrity, in accordance with an embodiment of the disclosure;

FIG. 2 illustrates a process flow for monitoring webpage integrity, in accordance with an embodiment of the disclosure.

Figure 3:
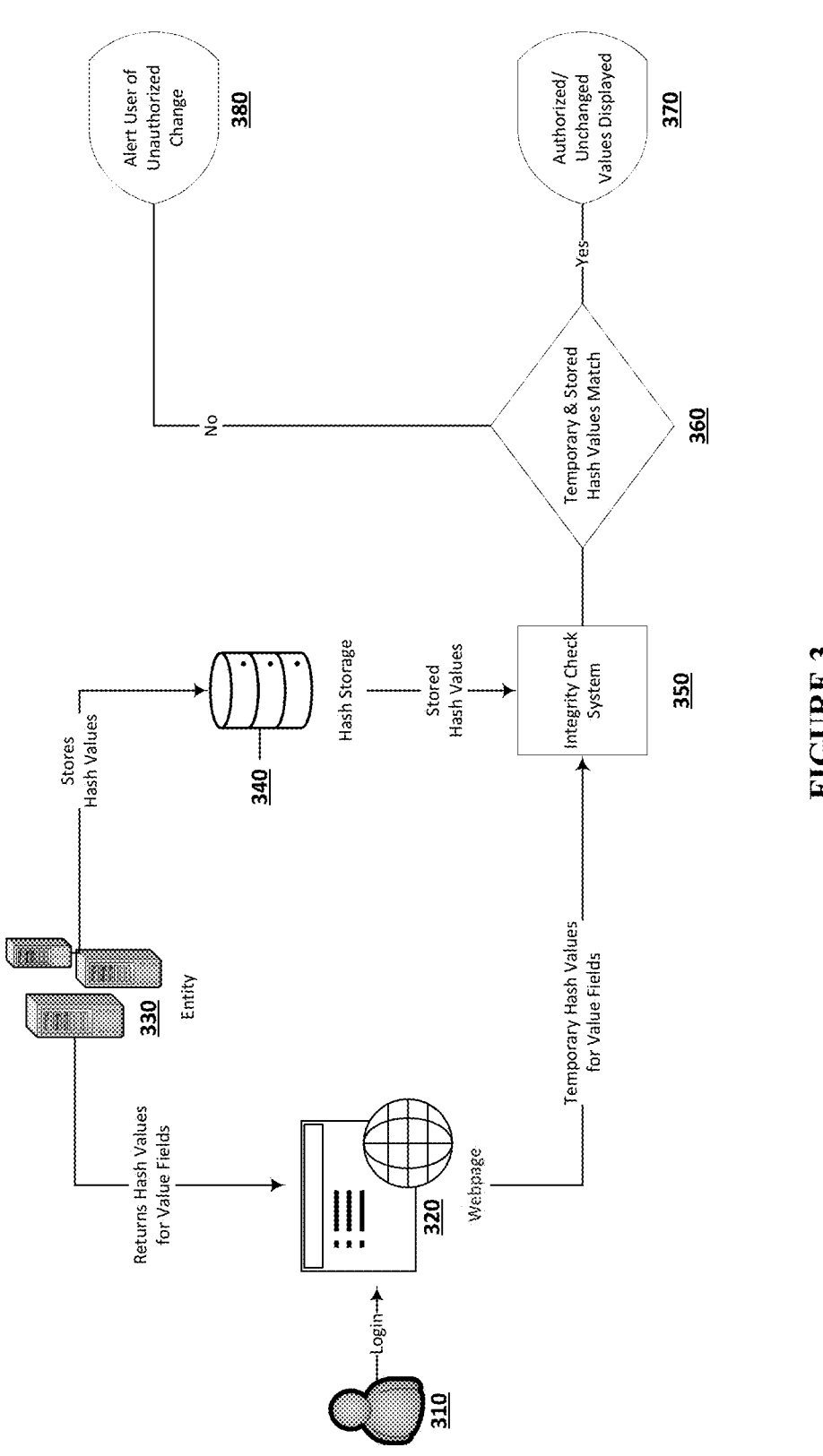

FIG. 3 illustrates a use case in which the user first logs into the entity's webpage.

Figure 4:
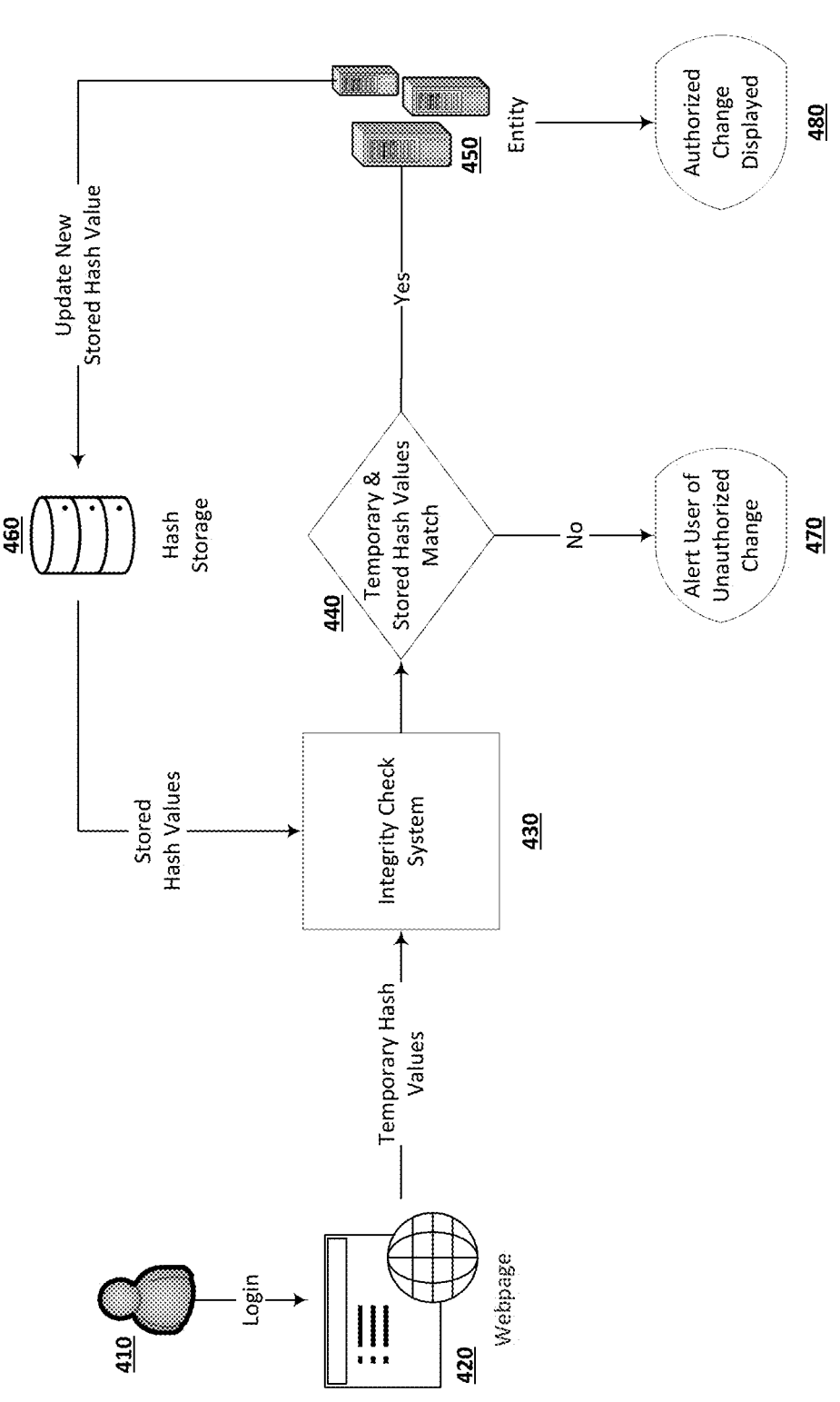

FIG. 4 illustrates a use case in which an authorized change is made by the entity upon the request of the user.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiment of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object-oriented, scripted or unscripted programming language such as JAVA®, PERL®, SMALLTALK®, PYTHON® or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram blocks or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a Graphical User Interface (GUI) or an interface to input computer-executable instructions that direct a processor to carry out specific functions. The user interface typically employs certain input and output devices such as a display, mouse, keyboard, button, touchpad, touch screen, microphone, speaker, LED (Light-Emitting Diode), light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a Personal Identification Number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

The present disclosure provides for monitoring webpage integrity to counteract and protect webpage users from potential social engineering scams and attacks.

A recently common form of online attacks against users of webpages includes bad actors using social engineering to essentially trick users by altering the information on a webpage the user is looking at. An example of this form of attack may be illustrated by the following scenario. An account holder at a financial institution (the user) may get a notification, such as by text or email, stating that there in an issue with the user's account that requires a maintenance check and asking the user to call customer service at the number provided, where the number provided is routed towards a bad actor conducting this scam. The user calls the number, and the bad actor tells the user that they need to have access to the user's system to conduct the maintenance check. The bad actor then asks the user to download remote control software, such as TEAMVIEWER®. Through such remote-control software, the bad actor is able to access and use the user's system simultaneously with the user. The bad actor may then ask the user to log into the user's bank account. The bad actor may open browser tools in the background and edit the contents of the page to reflect, for example, an altered bank balance, which the user would see displayed. The bad actor may report to the user that there was an erroneous transfer and to transfer back the extra funds.

A scam or online social engineering attack like the one illustrated by the scenario above is predicated on unauthorized changes to the content of a webpage. By monitoring and verifying the integrity of a webpage and flagging unauthorized changes to the content shown to the user, such scams and attacks may be circumvented.

Accordingly, the present disclosure uses hash verification to continuously monitor webpage integrity, detect unauthorized changes to the content of the webpage and alert users when an unauthorized change is made.

FIGS. 1A-1C illustrate technical components of an exemplary distributed computing environment for monitoring webpage integrity 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., Automated Teller Machine (ATM)), and/or edge devices such as routers, routing switches, Integrated Access Devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., Universal Serial Bus (USB), BLUETOOTH®, ETHERNET®, wireless ETHERNET®), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In-Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM (Non-Volatile Random Access Memory). In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS (Global Positioning System) device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing, and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a BLUETOOTH®, WI-FI®, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for monitoring webpage integrity, in accordance with an embodiment of the disclosure. In some embodiments, one or more systems for monitoring webpage integrity (e.g., similar to the system 130 described herein with respect to FIGS. 1A-1C, similar to the end-point device(s) described herein with respect to FIGS. 1A-1C, or the like) perform the process flow 200.

As shown in block 202, the process flow may include implementing a hash verification process to detect unauthorized changes to one or more value fields of a webpage. The webpage may be controlled by an entity, where the entity may be any organization, establishment, company, or institution, such as a financial institution, or the like. The webpage is made up of source code and the source code may include one or more value fields. In the context of a financial institution, for example, there may be value fields for each of the name of the account holder, account balance, account number, name of transfer recipients, details of transactions, or the like.

In some embodiments of the invention, the hash verification process may include generating and storing one or more hash values when the webpage first loads during a user's web session on the webpage. The webpage may first load, among others, when the user first enters the webpage or when the user enters in the user's authentication credentials or otherwise logs into the webpage. Each stored hash value is generated for a corresponding value field, such that each value field would have a corresponding and unique hash value. In some embodiments of the invention, the stored hash values would be stored in the user session storage and would be deleted once the user session ends. The user session may end, for example, when the user logs out or closes the webpage. When a second user session begins, such as when the user logs in or opens the webpage again, new hash values would be generated for all value fields and stored anew. In further embodiments, a second user session may begin immediately after the first user session ends.

In specific embodiments of the invention, the hash verification process may further include generating one or more temporary hash values for each subsequent time that the webpage loads or reloads during the user's web session. Each temporary hash value is generated for a corresponding value field, such that each value field would have a corresponding and unique hash value. The temporary hash values may not be stored and may be regenerated every time the page loads or reloads within the user session. Each time temporary hash values are generated, the temporary hash values are compared with the stored hash values, such that the temporary hash value generated for a specific value field would be compared with the stored hash value corresponding with that value field. In some embodiments, all temporary hash values may be compared with all stored hash values. Such comparison may help detect an unauthorized change when there are more stored hash values than temporary hash values or vice-versa, indicating that a value field was added or removed altogether.

In more specific embodiments of the invention, a change is determined to be unauthorized when the temporary hash values and stored hash values do not match. In further embodiments, the webpage reloads each time a change is made, whether authorized or unauthorized. Thus, when a change is made, the webpage reloads, triggering a comparison, allowing all changes to be monitored and verified.

In further embodiments of the invention, an authorized change to a value field would result in the stored hash value corresponding to the changed value field being updated directly by the entity. An authorized change may be one made by the entity directly or at the request of the user or another trusted source. For example, in the case of a financial institution, the financial institution may make a change to the user's account of its own accord, such as if it's deducting maintenance assessment from the user's account, at the request of the user, such as if the user requested to transfer money out of the user's account, or at the request of another trusted source, such as if the financial institution was requested by another individual or entity to transfer money into the user's account. If an authorized change is made during the user session, the stored hash value would change along with the value field. The webpage would reload as soon as the change is made, but since the stored hash value was also changed, when the temporary hash value is compared to the stored hash value, it would not be detected as an unauthorized change. In further embodiments, any display of the value field on the webpage or to the user would also change for the user to see.

In specific embodiments of the invention, the system further includes an Application Programming Interface (API). The user may request an authorized change from the entity using the API. For example, in the case of a financial institution, if the user attempts to make a transfer through the financial institution's webpage, the request for the transfer would go to the financial institution and the financial institution would make the changes to reflect such transfer, making those changes authorized changes.

As shown in block 204, the process flow may also include generating an alert to the user to notify the user that it detected an unauthorized change. The alert is communicated to the user. In some embodiments, the alert may be communicated to the user by displaying the alert on the webpage during the user's web session. In further embodiments, the alert may be communicated to the user through a text alert, email, or notification on the entity's phone application in addition to or in lieu of the alert being displayed on the webpage. In yet further embodiments, the user may also be sent an information sheet with more details about the unauthorized changes detected, information about the consequences of such a detection, steps for the user to take to prevent further issues, or the like.

In other specific embodiments of the invention, a second alert may be generated and communicated to the entity in response to determining that there was an unauthorized change. The entity may be alerted that there was an unauthorized change and may be provided with details about the unauthorized change. Such an alert could prompt the entity to ask, either automatically or on a case-by-case basis, the user to change the user's password or authentication credentials, for example.

In other embodiments of the invention, upon the detection of an unauthorized change to one or more value fields, the user may be locked out of the user's account or closed out of the webpage altogether. Specifically, anyone logged in using the user's authentication credentials may be logged out. In further specific embodiments, the user may not be able to log back in until the user contacts the entity or changes the authentication credentials.

FIG. 3 illustrates a use case in which the user 310 logs into the entity's 330 website. As soon as the webpage 320 the user 310 lands on loads, the entity 330 generates hash values for each of the value fields on the webpage 320 and stores that first set of hash values in the user session storage, or hash storage 340. Whenever the webpage 320 reloads, the entity 330 returns temporary hash values for each of the value fields. The integrity check system 350, an embodiment of the present invention, retrieves the stored hash values and from the user session storage 340 as well as the temporary hash values from the entity 330 and compares both sets of hash values. The integrity check system 350 determines whether the temporary and stored hash values match 360. If they match, the webpage 320 remains the same and displays the unchanged values 370. If they do not match, the user 310 is alerted of the unauthorized change 380.

FIG. 4 illustrates a use case where an authorized change is made by the entity 450. As soon as the webpage 420 the user 410 lands on loads, the entity 450 generates hash values for each of the value fields on the webpage 420 and stores that first set of hash values in the user session storage, or hash storage 460. The user 410 then makes a request of the entity 450 through the webpage 420. The user 410 may make such a request with the use of an application programming interface. The entity 450 receives the request, makes the change to the relevant value field(s) and updates the hash values stored in the user session storage 460 accordingly. When the change is made, the webpage 420 reloads, and the temporary hash values are generated. The integrity check system 430, an embodiment of the present invention, compares the temporary hash values to the stored hash values 440, as updated by the entity 450 upon the entity making the change(s) to the value field(s). If the temporary and stored hash values match, the authorized change is displayed 480, and the user 410 can continue with the user session normally. If the temporary and stored hash values do not match, the user 410 is alerted of an unauthorized change 470.

Thus, according to embodiments of the invention, which will be discussed in greater detail below, the present invention provides for monitoring a webpage for unauthorized changes. Specifically, webpage integrity is monitored through hash verification, which includes generating and storing hash values corresponding to the value fields in the webpage's source code when the webpage first loads during a user session and generating temporary hash values whenever the webpage loads or reloads during that user session. The temporary hash values are compared with the stored hash values, and if they do not match, an alert is generated and communicated to the user, notifying the user of any unauthorized changes. In specific embodiments of the invention, authorized changes may be made by the entity when the entity updates the stored hash value corresponding to the value field changed by the entity. Further embodiments include generating a second alert and communicating that second alert to the entity, notifying the entity of any unauthorized changes.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for monitoring webpage integrity, the system comprising:

a webpage controlled by an entity and comprising source code including one or more value fields, the webpage being hosted by the entity for use by a user via a web session on an end-point device; and a source code addendum embedded into the source code and configured to:

implement, automatically and without user intervention, a hash verification process to detect unauthorized changes to the one or more value fields, wherein the hash verification process includes generating and storing one or more hash values when the webpage initially loads during the web session, wherein each of the one or more stored hash values is generated for a corresponding value field from amongst the one or more value fields, and wherein the hash verification process is independently implemented for different web sessions, generate an alert and communicate the alert to the user in response to determining that there was an unauthorized change, wherein the user is conducting the web session on the webpage.

2. The system of claim 1, wherein the hash verification process further includes generating one or more temporary hash values for each subsequent time that the webpage loads or reloads during the web session and comparing the temporary hash values with the stored hash values, wherein each of the one or more temporary hash values is generated for a corresponding value field from amongst the one or more value fields.

3. The system of claim 2, wherein source code addendum is further configured to determine that there was an unauthorized change when the temporary hash values do not match the stored hash values.

4. The system of claim 1, wherein an authorized change to a value field results in the stored hash value corresponding to the changed value field being updated directly by the entity.

5. The system of claim 1, the system further comprising an Application Programming Interface (API), wherein the user may request an authorized change from the entity using the API.

6. The system of claim 1, wherein the source code addendum is further configured to generate the alert and communicate the alert to the user, wherein communicating the alert includes displaying the alert on the website during the web session.

7. The system of claim 1, wherein the source code addendum is further configured to generate a second alert and communicate the second alert to the entity in response to determining that there was an unauthorized change.

8. A computer-implemented method for monitoring webpage integrity, the method comprising:

implementing, automatically and without user intervention, a hash verification process to detect unauthorized changes to one or more value fields of a webpage, wherein the webpage is controlled by an entity and comprises source code that includes the one or more value fields, the webpage being hosted by the entity for use by a user via a web session on an end-point device, wherein the hash verification process includes generating and storing one or more hash values when the webpage initially loads during the web session, wherein each of the one or more stored hash values is generated for a corresponding value field from amongst the one or more value fields, and wherein the hash verification process is independently implemented for different web sessions, generating an alert and communicating the alert to the user in response to determining that there was an unauthorized change, wherein the user is conducting the web session on the webpage.

9. The computer-implemented method of claim 8, wherein the hash verification process further includes generating one or more temporary hash values for each subsequent time that the webpage loads or reloads during the web session and comparing the temporary hash values with the stored hash values, wherein each of the one or more temporary hash values is generated for a corresponding value field from amongst the one or more value fields.

10. The computer-implemented method of claim 9, wherein the method further includes determining that there was an unauthorized change when the temporary hash values do not match the stored hash values.

11. The computer-implemented method of claim 8, wherein an authorized change to a value field results in the stored hash value corresponding to the changed value field being updated directly by the entity.

12. The computer-implemented method of claim 8, the method further comprising the user requesting an authorized change from the entity using an Application Programming Interface (API).

13. The computer-implemented method of claim 8, the method further comprising generating the alert and communicating the alert to the user, wherein communicating the alert includes displaying the alert on the webpage during the web session.

14. The computer-implemented method of claim 8, the method further comprising generating a second alert and communicating the second alert to the entity in response to determining that there was an unauthorized change.

15. A computer program product for monitoring webpage integrity, the computer program product comprising at least one non-transitory computer-readable medium having computer-readable program code portions embodied therein, the computer readable code portions comprising:

an executable portion configured to implement, automatically and without user intervention, a hash verification process to detect unauthorized changes to one or more value fields of a webpage, wherein the webpage is controlled by an entity and comprises source code that includes the one or more value fields, the webpage being hosted by the entity for use by a user via a web session on an end-point device, wherein the hash verification process includes generating and storing one or more hash values when the webpage initially loads during the web session, wherein each of the one or more stored hash values is generated for a corresponding value field from amongst the one or more value fields, and wherein the hash verification process is independently implemented for different web sessions, an executable portion configured to generate an alert and communicate the alert to the user in response to determining that there was an unauthorized change, wherein the user is conducting the web session on the webpage.

16. The computer program product of claim 15, wherein the hash verification process further includes generating one or more temporary hash values for each subsequent time that the webpage loads or reloads during the web session and comparing the temporary hash values with the stored hash values, wherein each of the one or more temporary hash values is generated for a corresponding value field from amongst the one or more value fields.

17. The computer program product of claim 16, wherein the computer program product further includes an executable portion configured to determine that there was an unauthorized change when the temporary hash values do not match the stored hash values.

* * * * *